UNITED STATES PATENT OFFICE 2,303,080

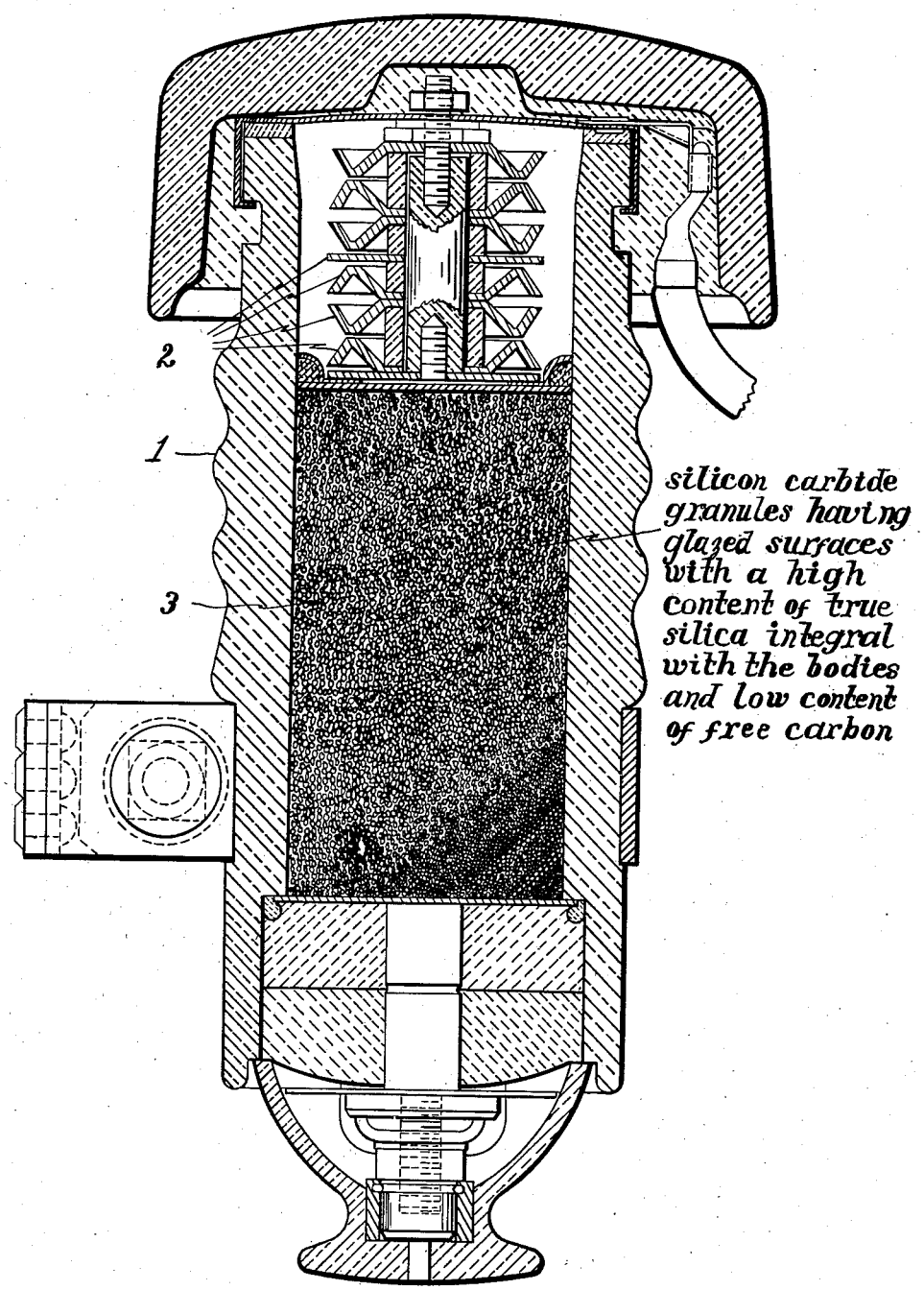

DEVICE FOR CURRENT CONTROL AND DISCHARGE OF TRANSIENT OVERVOLTAGES

Otis Hutchins, Niagara Falls, N. Y., and John Robert McFarlin, Philadelphia, Pa., assignors, by mesne assignments, to Electric Service Supplies Company, Philadelphia, Pa., a corporation of Pennsylvania Original application September 23, 1935, Serial No. 41,834, now Patent No. 2,150,167, dated March 14, 1939. Divided and this application March 11, 1939, Serial No. 261,290

10 Claims. (Cl. 201—76)

Our invention relates to improvements in methods and devices for discharging or equalizing excessive electrical potentials for protective purposes and for controlling the flow of electricity, which utilize a "characteristic element" or material having a rapid decrease in resistance when subjected to increasing voltages, and providing what is commonly known as a valve action.

Our improvements are applicable to a wide variety of apparatus used in connection with the production, transmission and use of electricity and particularly in connection with lightning arresters, high potential dischargers, voltage equalizers, surge absorbers, resistors, rectifiers, oscillation damping elements, current isolators, voltage subdividers, voltage reducers and electrothermal elements.

We have discovered that the variations in the resistivity of masses of crystalline valve action granules with variations in voltage is accelerated by the presence of oxides, and particularly of silica, on the surfaces of the granules particularly when such masses are used in conjunction with spark gaps; and that "dynamic failure voltage" may be increased by the use of such granules in discharge paths provided for discharging and equalizing high electrical potentials.

Our invention involves the control of the flow of electric current by providing therefor a path containing such granules having oxidized surfaces and consisting preferably of crystalline silicon carbide having an integral surface bloom or coating of metallic oxide, principally true silica, with a low content of carbon. The bloom or coating generally contains small amounts of other metallic oxides, such as iron oxide or alumina.

This bloom or coating of silica is formed integrally on the crystalline surfaces by the oxidation thereof, preferably by roasting and tumbling the silicon carbide in the presence of an oxidation accelerator, such as iron oxide, lead oxide or nickel oxide, under oxidizing conditions, as set forth in our Letters Patent No. 2,150,167, whereof the present application is a division.

Excessive roasting or accelerator results in the formation of a surface glaze, in the form of a thin film or in the form of slagged lumps, while maintaining the high surface content of true silica which results from the disintegration or decomposition by oxidation of the surface of the silicon carbide crystals. Such glazed oxidized silicon carbide is less advantageous for discharging or equalizing excessive electrical potentials than the oxidized silicon carbide, having a dull, mat, porous or powdery surface, claimed in our Patent No. 2,150,167, but may be more advantageously used for certain electrical purposes than commercially pure silicon carbide crystals heretofore used.

The silicon carbide is preferably oxidized in the form of discrete or non-agglomerated crystals, and may be used in such form in accordance with our invention as discrete grains or granules closely compacted under pressure in a container, or the grains may be bonded together to form blocks, rods, or other shapes by suitable binders, such as ceramics, organic binders or the like, and a greatly improved bond is effected by the use of oxidized silicon carbide granules having slagged lumps thereon, particularly when such granules are bonded under heavy pressure with a minimum amount of binder.

The primary advantages of our invention result, however, from the great improvement in electrical characteristics of devices embodying silicon carbide granules having oxidized surfaces, as compared with the silicon carbide granules which are substantially or commercially pure. The improved electrical characteristics imparted to the oxidized silicon carbide grains vary with the amount of true silica and free carbon on the surface thereof and the glaze of the surface.

The changed and improved electrical characteristics of crystalline granules having silicon carbide cores and oxidized surfaces are evidenced by their higher impedance to dynamic currents; and the increase in their "dynamic failure voltage," or the voltage required to maintain a continuous flow of dynamic current through a column of granules generally in series with one or more arc gaps, after an initial flow of dynamic current has been initiated by means of an impulse or surge current passed through the granules while the dynamic voltage is connected therewith.

When the silica coating is in the form of a glaze or of slagged lumps, the impedance to surge or impulse currents is increased as compared with the impedance thereto of ordinary silicon carbide and may be used more advantageously than the latter in isolators, voltage subdividers, etc.

In devices for discharging or equalizing excessive electrical potentials for protective purposes, it is important that the dynamic failure voltage be as high as possible and in excess of certain predetermined minimum values under given conditions of test appropriate to the particular installation.

Excellent results are obtainable with grain having a true silica content of 1.7% to 1.9%, and with the surface silicon, iron, aluminum and free carbon kept as low as possible. The discharge or flow of electric currents may, however, be advantageously controlled or regulated by providing a conducting path containing silicon carbide granules having a surface coating of true silica as low as .5% and up to 3% or higher, and with a free carbon content up to .05% if the true silica content is correspondingly high.

Characteristic elements for lightning arresters embodying our present invention possess very high resistance to low values of voltage impressed across the terminals but are relatively good conductors at high values of voltage impressed across the terminals, and consequently permit currents of abnormal voltage to flow with relatively little impedance but offer very high resistance to current tending to flow by reason of normal system voltage impressed across the terminals of the characteristic elements.

By the utilization of our improvements in such an arrester, a minimum quantity of granules may be employed to secure the desired arc suppressive effect, and such granules impose minimum permissive impedance to surge currents combined with the desired impedance to dynamic current and arc suppressive effect. The granules have a high degree of permanence under normal operating conditions and hold to their original characteristics, so that the efficiency of the arrester is unaffected over long periods of time, and the granules exhibit to a very marked degree the inverse change in resistance due to variations in voltage impressed across them. By our improvements, the performance of lightning arresters of like construction are rendered much more uniform and there is avoided the wide variations in the performance of lightning arresters heretofore made embodying characteristic elements, and the causes of which have been unascertained.

Our studies have indicated that where the content of surface silicon approximates or is greater than the content of true silica on the surface, it has a deleterious effect on the arc suppressing capacity of the arrester. In silicon carbide granules where the percentage of silica is in excess of the silicon, and particularly where it is greatly in excess, slight variations in surface silicon seem to have relatively little effect on the characteristics of the grain for lightning arrester use, but it appears probable that if the surface silicon could be practically eliminated, such elimination would measurably better the granules for lightning arrester use, but it has so far been found impossible to eliminate the surface silicon and at the same time secure the desired high percentage of surface silica.

The presence of free carbon on the silicon carbide granules has been found to lower the impedance to the passage of surge currents but likewise lowers the impedance to dynamic current and lowers the arc suppressive effect of the granules, thereby necessitating the use of longer column lengths of granules to secure proper lightning arrester operation on circuits having a given voltage rating. It is therefore deemed preferable to hold to a minimum or eliminate free carbon from the granules used in practicing our invention.

The amount of true surface silica on silicon carbide granules very definitely affects the performance of such granules as characteristic elements of lightning arresters and other current discharging, voltage, equalizing and control apparatus.

When the surface silica is converted into thin iridescent films on the grains, the arc suppressive effect is maintained or improved but the impedance is substantially increased as compared with grains having porous surfaces as described in our Patent No. 2,150,167. Consequently, where conditions are such that it is possible to sufficiently decrease the length of the crystal path to obtain desired values of impedance, lightning arresters may be evolved in accordance with the present invention from glazed grain suitable for given voltage ratings. Where, however, it is found that to obtain the desired value of impedance necessitates so shortening the crystal path as to render possible the formation of arcs across or through the mass from the end electrodes in contact therewith, the surface silica should be in the form of a porous coating or bloom, in accordance with the invention of our Patent No. 2,150,167.

The accompanying drawing is a longitudinal sectional view illustrating the embodiment of our invention in a lightning arrester. In the embodiment of our invention illustrated in the drawing, the housing 1 contains spaced electrodes 2 forming spark gaps in series with the discrete mass 3 of silicon carbide granules having surfaces oxidized and glazed in accordance with our present invention; the spark gaps being proportioned relatively to the normal voltage of the circuit for which the arrester is designed, and the length of the crystalline path and the size of the granules being proportioned to produce an arc suppressive or interrupting effect proportional to the normal system voltage. The other structural features of the arrester per se form no part of the present invention and hence are not specifically described.

Having described our invention, we claim:

1. A device for controlling the flow of electric current including a container containing a current-carrying compacted mass of discrete grains of crystalline, valve action silicon carbide granules having integral oxidized glazed surfaces containing oxide, principally silica, on the granules.

2. A device for controlling the flow of electric current and comprising a body of grains having crystalline silicon carbide cores and having surfaces composed of disintegrated portions of the crystalline structure converted into oxide consisting principally of silica with small amounts of iron oxide and alumina.

3. A device for discharging or equalizing excessive electrical potentials for protective purposes comprising a discharge path containing a mass or body of granules having integral surface coatings containing silica and silicon; the silica being substantially in excess of the silicon.

4. A device for controlling the flow of electric current including a current-carrying mass of crystalline granules having glazed oxidized surfaces containing silica integral with the crystalline portions of the granules, said surfaces being free from at least a portion of the carbon normally present in silicon carbide.

5. A device for controlling the flow of electric current including a current-carrying mass of silicon carbide granules having slagged surface coatings composed principally of silica integral with the granules and free from at least a portion of the carbon normally present in silicon carbide.

6. A device for discharging or equalizing excessive electrical potentials for protective purposes comprising a body of granules having silicon carbide bodies and having slagged surfaces containing silica integral with the bodies and devoid of free carbon in excess of .05%.

7. A device for controlling the flow of electric current comprising a body of grains having silicon carbide bodies and having thereon slagged lumps with a high content of true silica integral with the bodies and a low content of free carbon.

8. A device for controlling the flow of electric current comprising a body of granules having crystalline silicon carbide bodies and surfaces composed of irridescent films consisting primarily of silica free from a portion of the carbon normally present in silicon carbide surfaces.

9. A device for discharging or equalizing excessive electrical potentials for protective purposes comprising a body of grains having crystalline silicon carbide bodies and glazed and slagged surfaces having a true silica content integral with the bodies of the order of 1.75% of the weight of the grain and a free carbon content not exceeding .05% of the weight of the grain.

10. A device for discharging or equalizing excessive electrical potentials for protective purposes comprising a mass of silicon carbide bodies bonded together by a binder and characterized by surface layers having slagged lumps of silica on and integral with such bodies, said slag lumps interlocking with said binder said surface layers being devoid of at least a portion of the carbon normally present in silicon carbide.

OTIS HUTCHINS.
JOHN ROBERT McFARLIN.